D. BOYD.

Hot-Air Furnace.

No. 6,290. Reissued Feb. 16, 1875.

WITNESSES:

A. F. Terry

Alex F. Roberts

INVENTOR:

D. Boyd

BY Munn & Co

ATTORNEYS.

UNITED STATES PATENT OFFICE.

DAVID BOYD, OF NEW YORK, N. Y.

IMPROVEMENT IN HOT-AIR FURNACES.

Specification forming part of Letters Patent No. 153,928, dated August 11, 1874; reissue No. 6,290, dated February 16, 1875; application filed January 25, 1875.

*To all whom it may concern:*

Figure 1:
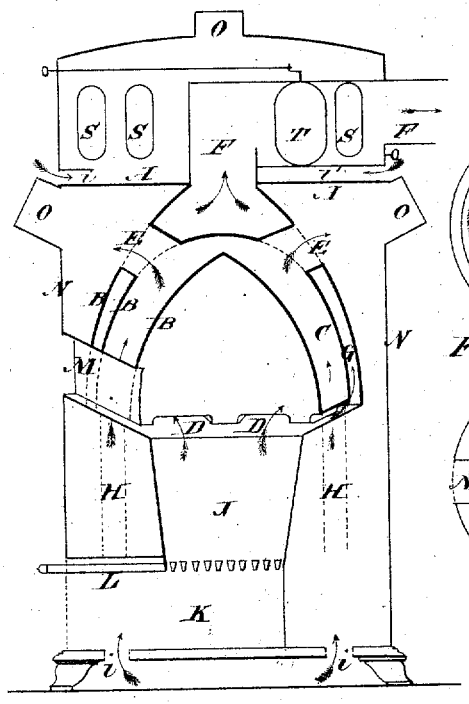
Figure 2:
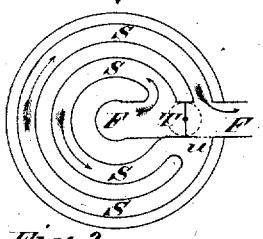
Figure 3:
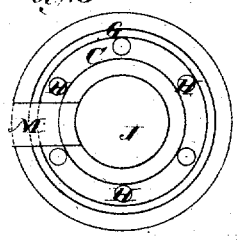

Be it known that I, DAVID BOYD, of the city, county, and State of New York, have invented a new and useful Improvement in Hot-Air Furnaces, of which the following is a specification:

In the accompanying drawing, Figure 1 represents a vertical section of the heater, showing the diaphragm and general arrangement of the parts. Fig. 2 is a horizontal section above the diaphragm. Fig. 3 is a horizontal section through the base of the dome above the fire-chamber.

Similar letters of reference indicate corresponding parts.

This improved apparatus is designed for use both as a heater for the apartment in which it may be located, and as a furnace for heating other parts of the building to which hot air may be conveniently or economically conveyed by pipes or tubes.

The features of novelty are hereinafter described generally, and indicated specifically in the claim.

The lower part of the heater is made up of domes B B B, fire-box J, ash-box K, inclosed in a casing having openings *o* for discharge of heated air. The air to be heated enters at *i*, traverses tubes H, and enters space C, whence it escapes at E. The products of combustion pass up through dome-space G into flue F. The upper part of the casing has one or more openings, *o*, or short tubes for escape of air. The upper compartment is occupied by the concentric flue, S, which communicates with the flue F at the center of the compartment, and also at the periphery or outside. The pivoted damper T is located in the flue F between the inner and outer portion of flue S to cause the products of combustion to take the circuitous and return course indicated by arrows in Fig. 2, or the direct one through passage F, thus, in large measure, controlling the degree of heat radiated by the heater, and also the rapidity of combustion. The air to be heated in the upper compartment enters apertures *i'* in the side of the casing, and passes through it in contact with the flue F. The construction thus far described is identical with the invention set forth in Letters Patent granted to me on the 11th day of August, A. D. 1874.

My present object is to more fully explain and specify the parts of my invention which should have been more fully described at the time of my application—that is, the usefulness of my diaphragm A, as connected with the casing N.

It will be seen that when the fire-box and dome covering the same are incased in the same chamber with the pipes and flues for carrying off the heated products of combustion, that the density of the heat surrounding said flues prevents the same from radiating heat, and it is thereby confined and carried up the chimney without being utilized, and thus wasted. The diaphragm A, being attached to casing N, as shown in Fig. 1, enables me to divide the casing N into two separate apartments, one incasing the fire-box and dome covering the same, the other incasing the pipes and flues carrying off the heated products of combustion. I can thereby supply each chamber separately with air to be heated, and utilize the heat from both, thus utilizing the heat above the diaphragm, which would otherwise be lost. It will also be seen by this arrangement that the heat obtained from the upper apartment will be free from contact with the red-hot surface of heater.

Having thus described my invention, I claim as new and desire to secure by Letters Patent—

The diaphragm A, in connection with the casing N, in combination with the upper compartment of casing N, the concentric flues S, inlet and discharge passage F, and damper T, the latter being arranged to control the direction of the smoke current, as shown and described.

DAVID BOYD.

Witnesses:
T. B. MOSHER,
ALEX. F. ROBERTS.